(12) United States Patent
Jordan et al.

(10) Patent No.: US 7,733,841 B2
(45) Date of Patent: Jun. 8, 2010

(54) VEHICLE NETWORK WITH TIME SLOTTED ACCESS AND METHOD

(75) Inventors: Patrick D. Jordan, Austin, TX (US); Walton L. Fehr, Mundelein, IL (US); Samuel M. Levenson, Arlington Heights, IL (US); Donald J. Remboski, Dearborn, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 1058 days.

(21) Appl. No.: 11/125,791

(22) Filed: May 10, 2005

(65) Prior Publication Data

US 2006/0259204 A1    Nov. 16, 2006

(51) Int. Cl.
*H04B 7/212* (2006.01)

(52) U.S. Cl. ............... 370/349; 370/445; 370/458; 370/350; 370/347; 455/502; 455/450

(58) Field of Classification Search ........... 370/336, 370/337, 345, 347, 349, 442, 458, 254; 340/870.13, 340/870.14, 10.2; 701/210; 455/502, 512, 455/452.2
See application file for complete search history.

(56) References Cited

U.S. PATENT DOCUMENTS

| | | | | |
|---|---|---|---|---|
| 4,736,367 A | * | 4/1988 | Wroblewski et al. | 340/3.51 |
| 4,907,222 A | * | 3/1990 | Slavik | 370/443 |
| 4,964,120 A | * | 10/1990 | Mostashari | 370/228 |
| 5,323,385 A | | 6/1994 | Jurewicz et al. | |
| 5,343,472 A | * | 8/1994 | Michihira et al. | 370/445 |
| 5,525,959 A | * | 6/1996 | Przybyla et al. | 340/438 |
| 5,710,798 A | * | 1/1998 | Campana, Jr. | 375/347 |
| 5,732,074 A | | 3/1998 | Spaur et al. | |
| 6,111,888 A | * | 8/2000 | Green et al. | 370/461 |
| 6,177,867 B1 | * | 1/2001 | Simon et al. | 340/468 |
| 6,330,236 B1 | * | 12/2001 | Ofek et al. | 370/369 |
| 6,356,823 B1 | | 3/2002 | Iannotti et al. | |
| 6,430,164 B1 | | 8/2002 | Jones et al. | |
| 6,526,335 B1 | | 2/2003 | Treyz et al. | |
| 6,559,783 B1 | | 5/2003 | Stoneking | |
| 6,665,601 B1 | * | 12/2003 | Nielsen | 701/50 |
| 6,738,701 B2 | * | 5/2004 | Wilson | 701/51 |
| 6,747,365 B2 | | 6/2004 | Reinold et al. | |
| 7,586,953 B2 | * | 9/2009 | Forest et al. | 370/503 |
| 2001/0001319 A1 | | 5/2001 | Beckert | |
| 2002/0010544 A1 | | 1/2002 | Rudow et al. | |
| 2002/0150050 A1 | | 10/2002 | Nathanson | |
| 2003/0043739 A1 | | 3/2003 | Reinold et al. | |
| 2003/0043750 A1 | | 3/2003 | Remboski | |
| 2003/0043779 A1 | | 3/2003 | Remboski et al. | |
| 2003/0043793 A1 | * | 3/2003 | Reinold et al. | 370/386 |

(Continued)

*Primary Examiner*—Sharad Rampuria

(57) ABSTRACT

A vehicle network and method for communicating information within a vehicle. The network includes a plurality of network elements joined by communication links. A data frame is provided for communicating information between a first device and a second device attached to the network. A network element in the network is capable of mapping a first resource on an incoming communication link of the network element to a second link resource of an outgoing communication link of the network element. The network element further has ports for receiving the data frame from the first link resource of the incoming communication link and for communicating the data frame to the second link resource of the outgoing communication link. The mapping may be done statically or dynamically such as based on information stored in the network element or based on information stored in the data frame.

20 Claims, 6 Drawing Sheets

U.S. PATENT DOCUMENTS

| | | |
|---|---|---|
| 2003/0043799 A1 | 3/2003 | Reinold et al. |
| 2003/0043824 A1 | 3/2003 | Remboski et al. |
| 2003/0045234 A1 | 3/2003 | Remboski |
| 2003/0045971 A1 | 3/2003 | Reinold |
| 2003/0045972 A1 | 3/2003 | Remboski |
| 2003/0046327 A1 | 3/2003 | Reinold et al. |
| 2003/0051131 A1 | 3/2003 | Reinold et al. |
| 2003/0065630 A1 | 4/2003 | Brown |
| 2003/0078006 A1* | 4/2003 | Mahany ........................ 455/63 |
| 2003/0093798 A1 | 5/2003 | Rogerson |
| 2003/0222982 A1 | 12/2003 | Hamdan |
| 2003/0230443 A1* | 12/2003 | Cramer et al. ............. 180/65.5 |
| 2004/0001593 A1 | 1/2004 | Reinold et al. |
| 2004/0002799 A1 | 1/2004 | Dabbish et al. |
| 2004/0003227 A1 | 1/2004 | Reinold |
| 2004/0003228 A1 | 1/2004 | Fehr et al. |
| 2004/0003229 A1 | 1/2004 | Reinold et al. |
| 2004/0003230 A1 | 1/2004 | Puhl |
| 2004/0003231 A1 | 1/2004 | Levenson et al. |
| 2004/0003232 A1 | 1/2004 | Levenson et al. |
| 2004/0003233 A1 | 1/2004 | Reinold et al. |
| 2004/0003234 A1 | 1/2004 | Reinold et al. |
| 2004/0003237 A1 | 1/2004 | Puhl et al. |
| 2004/0003242 A1 | 1/2004 | Fehr |
| 2004/0003243 A1 | 1/2004 | Fehr et al. |
| 2004/0003245 A1 | 1/2004 | Dabbish et al. |
| 2004/0003249 A1 | 1/2004 | Dabbish |
| 2004/0003252 A1 | 1/2004 | Dabbish et al. |
| 2004/0003750 A1 | 1/2004 | Theurer et al. |
| 2004/0043739 A1 | 3/2004 | Jordanger |
| 2004/0043824 A1 | 3/2004 | Uzelac |
| 2004/0045971 A1 | 3/2004 | Lothe |
| 2004/0213295 A1 | 10/2004 | Fehr |
| 2004/0227402 A1 | 11/2004 | Fehr et al. |
| 2004/0254700 A1 | 12/2004 | Fehr et al. |
| 2004/0258001 A1 | 12/2004 | Remboski et al. |
| 2005/0004727 A1 | 1/2005 | Remboski et al. |
| 2005/0004756 A1 | 1/2005 | Remboski et al. |
| 2005/0038583 A1 | 2/2005 | Fehr et al. |
| 2005/0058149 A1* | 3/2005 | Howe ........................ 370/428 |
| 2006/0020717 A1 | 1/2006 | Remboski et al. |
| 2006/0083172 A1 | 4/2006 | Jordan et al. |
| 2006/0083173 A1 | 4/2006 | Jordan et al. |
| 2006/0083229 A1 | 4/2006 | Jordan et al. |
| 2006/0083250 A1 | 4/2006 | Jordan et al. |
| 2006/0083264 A1 | 4/2006 | Jordan et al. |
| 2006/0083265 A1 | 4/2006 | Jordan et al. |
| 2006/0143345 A1* | 6/2006 | Fredriksson ................ 710/106 |
| 2006/0162986 A1* | 7/2006 | Disser et al. ................ 180/402 |
| 2006/0227793 A1 | 10/2006 | Fehr et al. |

* cited by examiner

VEHICLE NETWORK WITH TIME SLOTTED ACCESS AND METHOD

FIELD OF THE INVENTION

This invention in general relates to in-vehicle communication networks and particularly to packet delivery based upon time slotted access within communication networks within vehicles.

BACKGROUND OF THE INVENTION

Vehicle builders have been using serial communication (multiplexing) between controllers to share information and distribute control for some time. Doing so has greatly reduced the amount of vehicle signal wiring needed to implement the comfort, convenience, and safety features desired in modern consumer vehicles.

Control of the devices in the vehicle to implement desired features may be divided into controllers by function (powertrain, braking, steering, etc.), by location (engine compartment, seat, door, etc.) or in combinations thereof. The controller for each of the functions/zones may share information with other controllers using a shared-access serial bus. The bus usually follows an industry standard such as the Controller Area Network (CAN) protocol, the SAE J1850 Communication Standard, the Local Interconnect Network (LIN) protocol, the FLEXRAY Communications System Standard, and Media Oriented Systems Transport (MOST) Protocol. Multiple, independent buses may be used. In that case, one of the controllers may act as a gateway for information between incompatible buses.

An alternative architecture introduces the idea of dividing the vehicle into geographic regions and locating a single controller for all of the features in that region. This architecture may also include the concept of smart peripherals to reduce the number of interconnections in localized areas of the vehicle. The smart peripherals use simple serial communication buses such as the LIN bus to relay information from sensors to the zone controller or to accept actuator commands from the zone controller. The zone controllers may be linked by a serial communication bus structure.

Another alternative architecture incorporates a junction block that can be located in various zones of the vehicle. The junction block provides a mechanical and electrical connection point for power, ground and communication for small devices that are used to interface between input and output devices. The junction block also provides over current protection devices for the small connected devices, and multiple power sources distributed at different levels within the system.

Current bus protocols are not easily scalable and are limited in bandwidth. X-by-wire functionality, multimedia infotainment, navigation and other content intensive application will put more demands on bandwidth and quality of service (QoS) requiring marked improvements in bandwidth, speed, delay, jitter, fault tolerance, message integrity, guaranteed delivery, availability and survivability.

It is, therefore, desirable to provide a system and method to overcome or minimize most, if not all, of the preceding problems especially in the area of the automotive environment that provides scalability in both capacity and redundancy, at costs on par with existing bus architecture.

Figure 1:
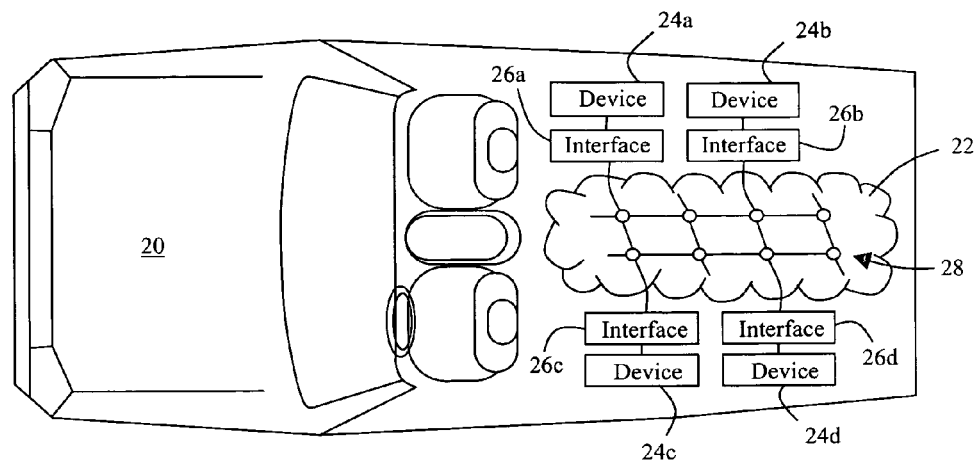
FIG. 1 is a block diagram illustrating an embodiment of a vehicle active network.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DETAILED DESCRIPTION

What is described is a system and method for communicating information within a vehicle. The network includes a plurality of network elements joined by communication links. A data frame is provided for communicating information between a first device and a second device attached to the network. A network element in the network is capable of mapping a first resource on an incoming communication link of the network element to a second link resource of an outgoing communication link of the network element. The network element further has ports for receiving the data frame from the first link resource of the incoming communication link and for communicating the data frame to the second link resource of the outgoing communication link. The mapping may be done statically or dynamically such as based on information stored in the network element or based on information stored in the data frame.

Now, turning to the drawings, FIG. 1 illustrates a vehicle 20 including a network 22 to which various vehicle devices 24a-d are coupled via respective interfaces 26a-d. The vehicle devices 24a-d may be sensors, actuators, and processors used in connection with various vehicle functional systems and sub-systems, such as, but not limited to, diagnostics, control-by-wire applications for throttle, braking and steering control, adaptive suspension, power accessory control, communications, entertainment, and the like.

The interfaces 26a-d are any suitable interface for coupling the particular vehicle device 24a-d to the network 22, and may be wire, optical, wireless or combinations thereof. The vehicle device 24a-d is particularly adapted to provide one or more functions associated with the vehicle 20. These vehicle devices 24a-d may be data producing, such as a sensor, data consuming, such as an actuator, or processing, which both produces and consumes data. Of course, an actuator, typically a data-consuming device, may also produce data, for example where the actuator produces data indicating it has achieved the instructed state, or a sensor may consume data, for example, where it is provided instructions for the manner of function. Data produced by or provided to a vehicle device 24a-d, and carried by the network 22, is independent of the function of the vehicle device 24a-d itself. That is, the interfaces 26a-d provide data exchange between the coupled device 24a-d and the network 22.

The network 22 may include a switch fabric 28 defining a plurality of communication paths between the vehicle devices 24a-d. The communication paths permit multiple simultaneous peer-to-peer, one-to-many, many-to-many, etc. communications between the vehicle devices 24a-d. During operation of the vehicle 20, data exchanged, for example, between devices 24a and 24d may utilize any available path or paths between the vehicle devices 24a, 24d. In operation, a single path through the switch fabric 28 may carry all of a single data communication between one vehicle device 24a and another vehicle device 24d, or several communication paths may carry portions of the data communication. Subsequent communications may use the same path or other paths as dictated by the then state of the network 22. This provides reliability and speed advantages over bus architectures that provide single communication paths between devices, and hence are subject to failure with failure of the single path or delays based upon congestion of the path. Moreover, communications between other of the devices 24b, 24c may occur simultaneously using the communication paths within the switch fabric 28.

The network 22 is a packet data network which may comply with a transmission control protocol/Internet (TCP/IP), asynchronous transfer mode (ATM), Infiniband, RapidIO, or other packet data protocol now known or later developed. It may also include bus structures that are operated in a packet transit mode, as will be described herein later. As such, the network 22 may use data packets, having fixed or variable length, defined by one or more applicable protocols. For example, if the network 22 uses asynchronous transfer mode (ATM) communication protocol, ATM standard data cells are used.

The vehicle devices 24a-d need not be discrete devices. Instead, the devices may be systems or subsystems of the vehicle and may include one or more legacy communication media, i.e., legacy bus architectures such as the Controller Area Network (CAN) protocol, the SAE J1850 Communication Standard, the Local Interconnect Network (LIN) protocol, the FLEXRAY Communications System Standard, Media Oriented Systems Transport or MOST Protocol, or similar bus structures. In such embodiments, the respective interface 26a-d may be configured as a proxy or gateway to permit communication between the network 22 and a device using one of the legacy protocols.

Figure 2:
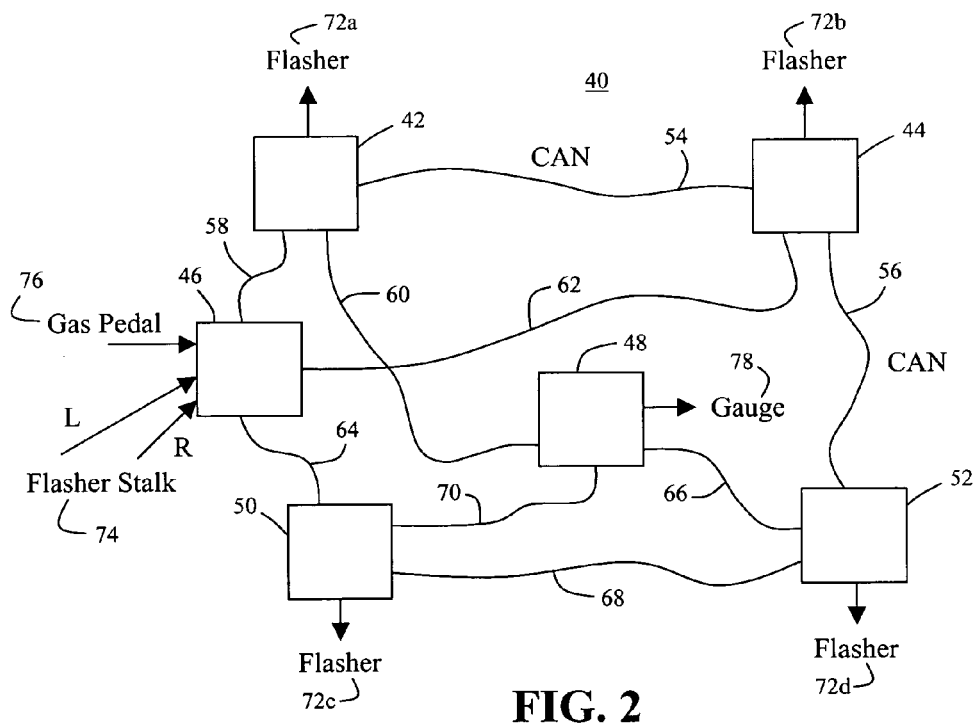
FIG. 2 is a schematic representation of a switch fabric forming a portion of a vehicle network.

Referring to FIG. 2, a network 40 that includes a plurality of network elements 42-52 communicatively coupled by communication links 54-70. A plurality of devices 72-78 are coupled at various locations, i.e., to several of the network elements 42-52 of the network 40 by corresponding communication links (not separately identified). The devices may be any vehicle devices such as flashers 72a-d, flasher control (stalk switch) 74, gas pedal 76, one or more gauges such as gauge 78 and the like.

The communication links 54-70 may be robust transport media and may be adapted from serial communication architecture as will be described. That is, the communication links 54-70 may be capable of providing guaranteed, reliable message transfer between the network elements. Any given communication link 54-70 may be a single bi-directional link, a single uni-directional link or combinations of bi-directional or uni-directional links or any combinations of link technologies. Moreover, the connection link 54-70 may be bounded media, such as wire or optical fiber, unbounded media, such as free optical or radio frequency, or combinations thereof. The links may be defined according to an existing, robust transport mechanism designed for the automotive environment such as CAN, LIN, FLEXRAY, J1850, and the like or may be defined according to transport protocols in development or that are later developed. The links may also be combinations of technologies, or specified in accordance with virtually any other protocol.

The network 40 may incorporate at some level a system management function providing supervision, control, diagnostics and other related functionality. This functionality may be provided by way of a separate entity coupled to the network 40, or the functionality may be distributed within the network elements 42-52 or other suitable elements of the network 40.

Figure 3:
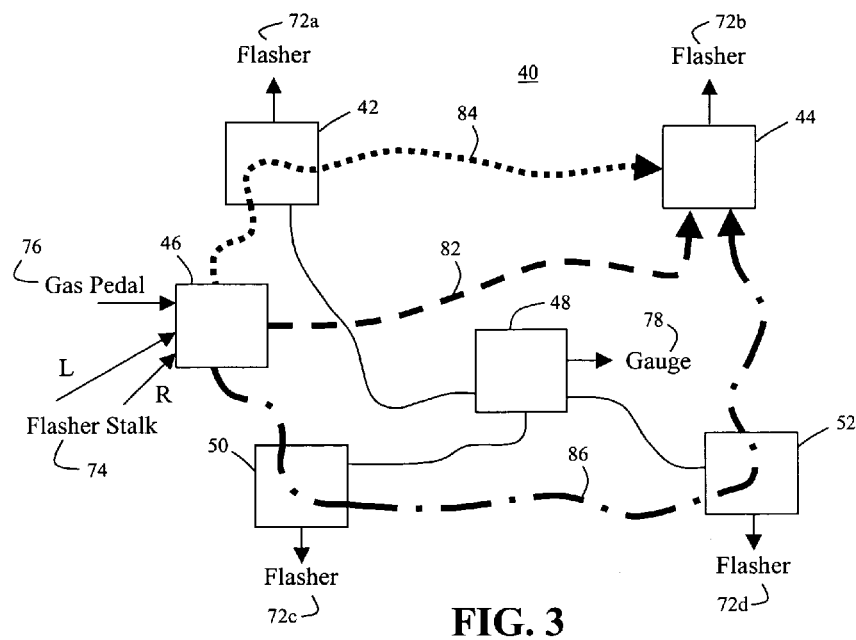
FIG. 3 is a schematic representation of a switch fabric forming a portion of a vehicle network and further illustrating communication paths within the network.

The cooperation of the network elements 42-52 and the connection links 54-70 define a plurality of communication paths between the devices 72-78 that are communicatively coupled to the network 40. FIG. 3 illustrates the flexibility provided by the network 40. As an example of this flexibility, consider the task of communicating a signal from the flasher control 74 to the flasher 72b. The network 40 is a packet based network, and permits any available communication path from a source point to a destination point to be used regardless of the communication media. As shown in FIG. 3, the signal from the flasher control 74 may traverse a relatively direct path 82 between the flasher control 74 defined by the network elements 46 and 44 and the communication link 62 joining them. If there is a disruption along the path 82 inhibiting communication of the data packets from the flasher control 74 to the flasher 72b, for example, if one or more elements are at capacity or have become disabled or there is a disruption in the connection media joining the elements along path 82, a new path, illustrated as path 84, via the network elements 46, 42, 44 and the communication links 58, 54 can be used. The path 84 may be dynamically generated or previously defined as a possible communication path, to ensure the communication between the flasher control 74 and the flasher 72b. Still a further path 86 via the network elements 46, 50, 52, 44 and the communication links 64, 68, 56 may be used.

The above example reveals that numerous communication paths may be defined. The availability of multiple paths allows the network to manage traffic to avoid congestion on one or more of the communication links 54-70 or at one or more of the network elements 42-52. The availability of multiple communication paths also permits fault tolerance in the event of failure of one or more network elements and/or communication links by permitting a communication path to be established bypassing the failed elements/links.

Figure 4:
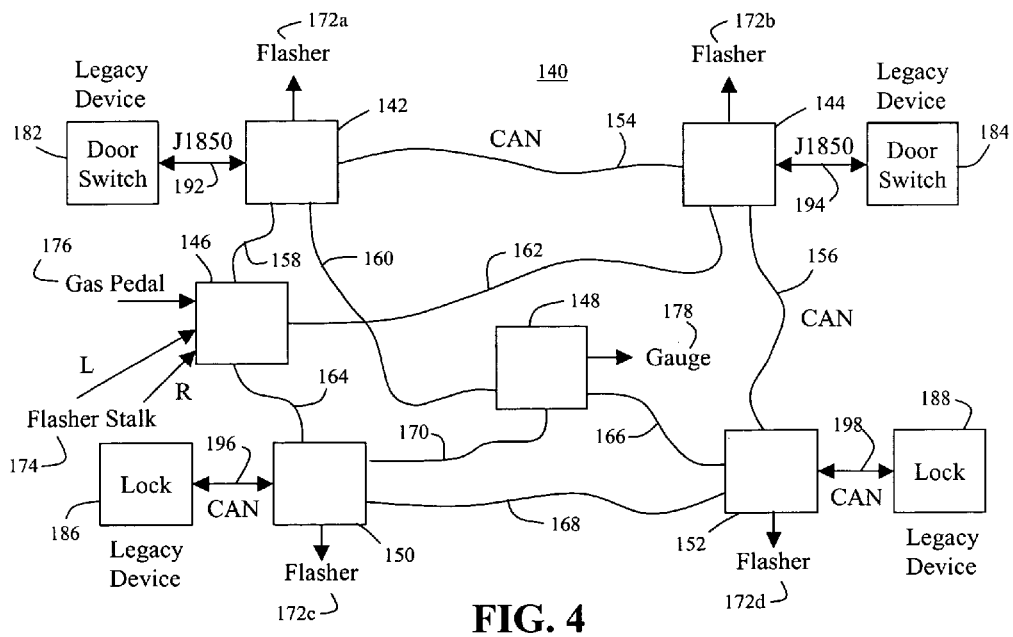
FIG. 4 is a schematic representation of a switch fabric forming a portion of vehicle network and further illustrating disparate communication links.

Referring now to FIG. 4, a network 140 includes a plurality of network elements 142-152 communicatively coupled by communication links 154-170. A plurality of devices 172-178 are coupled at various locations, i.e., to several of the network elements 142-152 of the network 140 by corresponding communication links (not separately identified). Legacy devices 182-188, i.e., devices adapted to communicate according to existing communication protocols such as J1850, CAN, LIN, FLEXRAY, MOST and the like, are also coupled to the network 140. For example, devices 182 and 184, illustrated as door switches, may be coupled to network elements 142 and 144, respectively, by J1850 communication links 192 and 194. Devices 186 and 188, in this example door locks, may be coupled to network elements 150 and 152, respectively, by CAN communication links 196 and 198. Moreover, any of the communication links may be specified according to any suitable, preferably robust transport protocol. As illustrated in FIG. 4, communication link 196 and 198 may be specified according to CAN protocol, while the remaining links may be specified according to TCP/IP, CAN, LIN, FLEXRAY, and the like.

Figure 5:
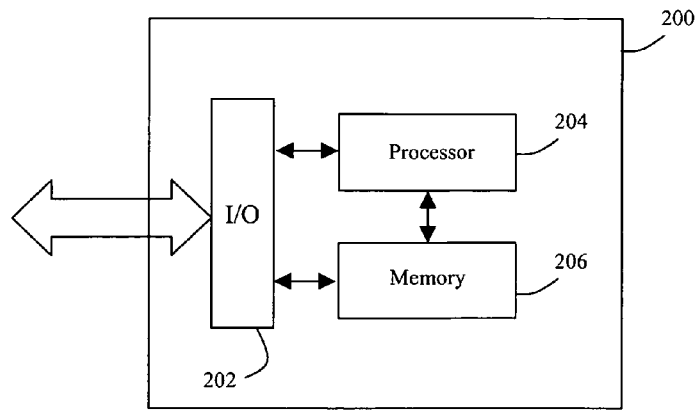
FIG. 5 is a block diagram of a network element that may be used in the networks shown in FIGS. 1-4.

A structure for the network elements may be as illustrated in FIG. 5. The network element 200 in FIG. 5 includes operationally coupled one or more input/output ports, one shown as port 202, a processor 204 and a memory 206. The memory 206 incorporates a control program (not depicted) to direct the processor to function in a manner that facilitates communication of data packets through the associated network. The input/output port 202 is adapted to be coupled to the communication links to send and receive data packets from the network element 200. Because the network element 200 may be coupled to more than one transport media type, the processor operates in accordance with the control program to accept data packets sent via a first transport media, to modify the data packets as necessary for communication via a second transport media and to communicate the data packets over the second transport media. In this manner, the network element may act as a proxy or gateway between the disparate communication media. It will be appreciated that alternate network elements may be used with enhanced functionality or simplified functionality as the application requires. For example, should the network element join connection links according to a single protocol, the processing capability for handling disparate protocols may not be required, and such a network element may be adapted to merely route the data packet according to the route information associated with the data packet.

Figure 6:
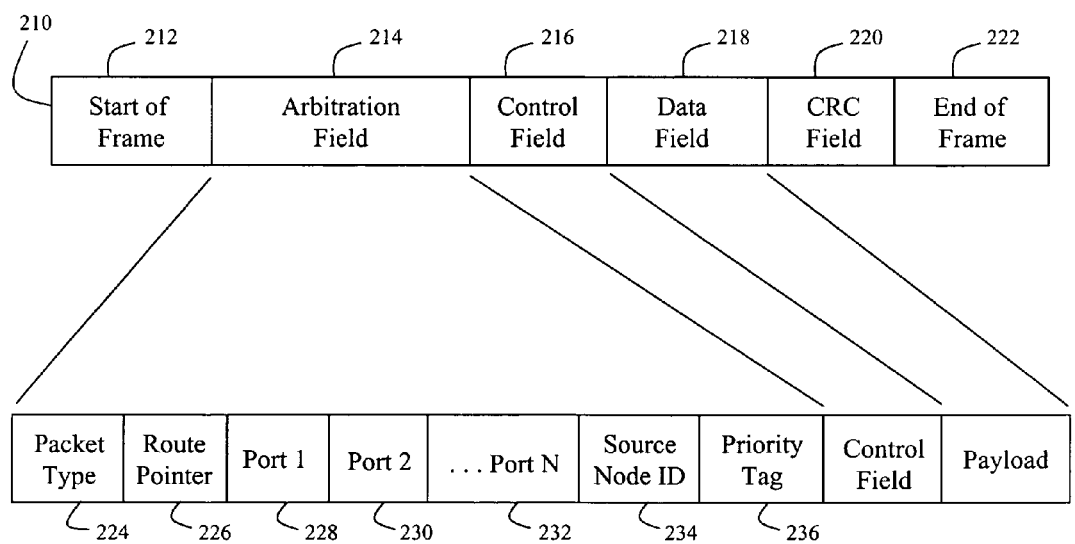
FIG. 6 is a schematic representation of a data packet.

A data packet used for communication within the networks described herein may include a packet type identifier, routing information, source ID information, Quality of Service (QoS) information and payload. Illustrated in FIG. 6 is an exemplary data packet 210 that may be used in the networks. The data packet 210 may include a start of frame field 212, an arbitration field 214, a control field 216, a data field 218, a cyclical-redundancy check field 220 and an end of frame field 222. The arbitration field 214 may be adapted to contain a packet type identifier 224, a route pointer 226, port identifiers 228, 230 and 232, a source node identifier 234 and a priority tag 236. The packet type 224 identifies the type of data packet such as bearer, discovery, advertisement, fault, control and the like. The route pointer 226, if the data packet contains route information, points to the current hop and is decrement with each hop. The route pointer 226 may also contain other types of route information. The port identifiers 228-232 identify the ports, e.g., network elements, the data packet has traversed. The source node 234 identifies the information source. The priority tag 236 may be reserved for Quality of Service (QoS) requirements and may contain a code identifying a service level for the data packet. The control field 216 may contain control data particular to the transport media, e.g., it may contain CAN control data if the data packet originated from or is destined for a CAN compliant communication device. The data field 218 contains the data carried by the packet, i.e., the payload.

The data packet 210 may be adapted to facilitate source routing, i.e., the route the data packet will take through the network is determined by the information source and this path information is contained within the data packet itself. The data packet 210 may also be adapted to facilitate destination routing, i.e., the route the data packet will take through the network is determined by each intermediate node and the next node information is contained within the data packet.

The data packet 210 may be adapted from known communication packet structures, such as a CAN data packet. As shown in FIG. 6, the arbitration field 214 is adapted to facilitate communication of data packets within the network 140 according to a number of different serial communication protocols. The arbitration field may also be adapted to contain routing information for communicating the data packet 210 through the network 140, i.e., information may be contained within the route pointer 226 field or otherwise contained within the arbitration filed 214. For example, the routing information may be a fixed label which remains with the data packet throughout the network 140. Each network element of the network 140 then includes a table to direct the data packet through the network 140 according to the label. Alternatively, the packet may be source routed, and the arbitration field may then contain routing information for each hop through the network. A further alternative is that the data packet 210, and particularly the arbitration information is modified at each hop so that it contains information for the next hop. Of course, other fields of the data packet 210 may be used to carry routing information, QoS information, or other types of information.

The networks 40 and 140 may be implemented into existing applications by adapting the communication links from existing robust communication medium. In the implementations shown in FIGS. 2-3, the communication links 54-70 may be specified according to the CAN protocol. Alternatively, the communication links 54-70 may be specified according to the LIN, FLEXRAY, J1850, MOST or other protocols. In the implementation shown in FIG. 4, the communication links 154-170 may be specified according to any suitable protocol such as CAN, LIN, FLEXRAY, J1850, MOST and the like. Each of these protocols may define an arbitration mechanism to provide for and permit flow control. Arbitration may be specified to give priority on the communication link to a message with the highest priority. Priority may be indicated within a data packet in a message header, such as the priority tag 236 of the data packet 210. For example, the message header may contain zeros in the most dominant bits. If two network elements try to transmit on the same communication link at the same time, the message with the highest priority, e.g., the lowest value in the dominant bits, will win and the all others will release the communication link.

On initial startup of a network according to the embodiments described herein, such as networks 40 and 140, it is necessary to identify all nodes of the network. The term "node" may refer to network elements, including but not limited to those network elements described in connection with networks 40 and 140, switches, routers and any and all coupled devices. It is also necessary to identify message identifiers that are of interest to particular nodes, to assign logical addresses to each node, to create a translation table of identifiers to node logical address, to create a routing table from node to node, and to create one or more back-up routes from node to node. Several levels of service may be associated with this so-called discovery process. For example, and as will be described in more detail, the network may offer nodes capable of multicast, encryption or other capabilities. Nodes may be configured to receive information or to advertise availability of information.

Discovery processes are known in connection with networks, and the commonly used Dijkstra algorithm may be employed to complete a network discovery process and calculate the routing table. These known processes however, assume a totally dynamic network and completes a full discovery process on each power up or upon detection of any failure. Depending on the scale of the network, this discovery process may take several minutes time, which is not practical in an automotive environment where the user expects to be able to enter the vehicle, start it and immediately operate it or where a fault may occur while the vehicle is operating and any significant delay in the completing the discovery process may present a safety concern. Having to wait several minutes for a discovery process to complete would be viewed as a defect, and would be unacceptable to users and manufacturers.

Networks according to the embodiments described herein generally are not totally dynamic. Generally, the network only becomes dynamic upon detecting a failure, i.e., the network is not dynamic until something goes wrong, or when new hardware is added to the network. Therefore, a last known state of the network may be saved and an incremental discovery process may be employed upon detecting a network change. The incremental discovery process may be completed with little or no effect on overall network performance. A suitable discovery process is disclosed and described in U.S. patent application Ser. No. 10/463,988 entitled a Discovery Process in a Vehicle Network, the disclosure of which is hereby expressly incorporated by reference.

The network architectures described herein provides greater flexibility, reliability and increased communication capability than existing architectures used in vehicle applications. For implementations using time slot switching, the communication capacity and flexibility of these networks may be enhanced further. In current time triggered bus configurations, the network is essentially a bus with time slots. The network elements may insert messages into an assigned time slot, but only within the assigned time slot. Once the network element is assigned a time slot, it is static and the time slot has significance throughout the network, i.e., only that network element may insert messages into that time slot.

In accordance with an embodiment of the invention, the network is configured to allow network elements to switch time slots in a frame such that information inserted into a time slot would only be received by a reselected element/group of elements with the need for the information. This may be accomplished through statistically assigning the modified routing or providing routing information within each data packet. The modified routing information allows intermediate nodes to switch the packet from a first time slot assignment to a second time slot assignment corresponding to the network element/group of network elements such that the packet eventually terminates at the desired network elements/group of network elements.

Figure 7:
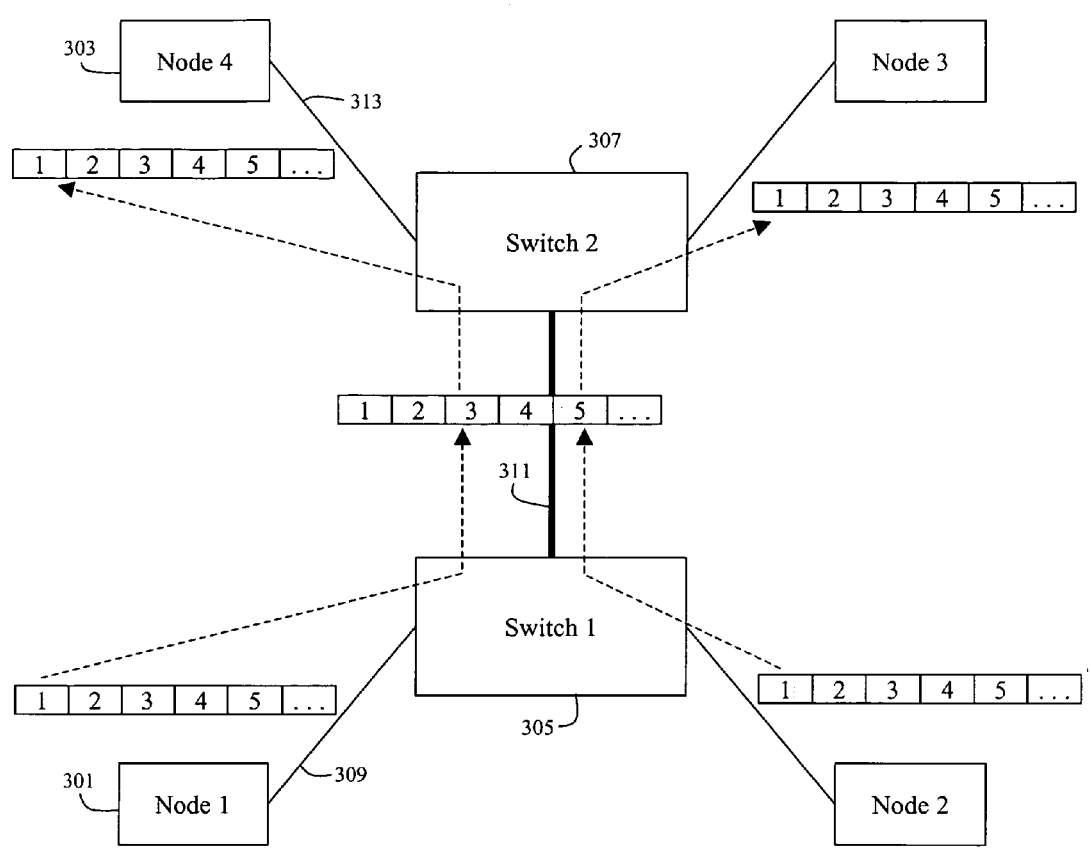
FIG. 7 is a graphic illustration of a network element and a time slot assignment methodology according to an embodiment of the invention.

Referring to FIG. 7, network element/node 301 is sending information to network element/node 303 through switch 305 and switch 307. On the element 301/switch 305 link 309, the payload, i.e., the information and data to be communicated within the resource, is communicated using a first link resource, e.g., time slot 1 of link 309. The payload is communicated using a second link resource on the switch 305/switch 307 link 311, e.g., time slot 3, and then is communicated again using the first link resource, e.g., time slot 1, on the switch 307/element 303 link 313.

The switch 305/switch 307 link 311 may have multiple physical links with the switches 305/307 being able to switch the payload from/to the elements 301/303 on any of the available resources of any of the physical links comprising the link 311. Of course, the mapping on the link 311 could be any of the available resources, e.g., any available time slots. Moreover, not every payload to be communicated between the network element 301 and the network element 303 via the switches 305 and 307 need be sent in the same resource on the link 311, so long as the packets are switched to the appropriate time slot for the destination network element on the destination element link, e.g., link 313.

It may be desirable or even necessary to preserve the deterministic nature of the communication network. For example, the network element 303 may be configured such that it always expects to receive the payload in time slot 1 or some other assigned time slot but for the sake of the following discussion it is considered to be time slot 1. Traditionally, this meant that the network element 303 is assigned time slot 1 and the assignment has meaning throughout the network. That is, every element sending information to the network element 303 would do so by placing the payload in time slot 1, and the network element 303 would always look for the payload in time slot 1. Such an a arrangement is inflexible and does not efficiently utilize the network resources. The network illustrated in FIG. 7 offers far greater utilization of resources. However, to preserve the deterministic nature of the network, that is to ensure that network elements that are configured to have an assigned time slot receive information properly, it is necessary to ensure that the payload be in appropriate time slot on links coupling the information to the network element. For the example shown in FIG. 7, this may be accomplished by providing time slot assignment data within adjacent network element, e.g. switch 307, which cause switch 307 to place information to be communicated to network element 303 in time slot 1, its assigned time slot. Alternatively, the payload itself may initially include or be altered in route to include information, such as route information, that is utilized by the various network elements to ensure the payload is ultimately present in the appropriate time slot at delivery. These later two possibilities are discussed further, below.

During a network configuration or discovery process, network devices that require an assigned network resource, like the network element 303 being assigned time slot 1, may be appropriately assigned resources and this information provided to the other network elements. In sending information to the network resource, the payload may be configured before being sent to include the resource assignment information. This information may then be used by the sending network element, or any intermediary network element so that ultimately the information is placed into the appropriate network resource on a last leg of the communication route that couples to the destination network element. Alternatively, the sending network element may place the information into a resource unaware of any particular assignment requirements for the destination resource. In this case, one or more of the intermediary network elements used to communicate the information to the destination network element may modify the information to contain the resource assignment information and/or may simply place the information in the appropriate resource prior to it being communicated to the destination network element.

Figure 8:
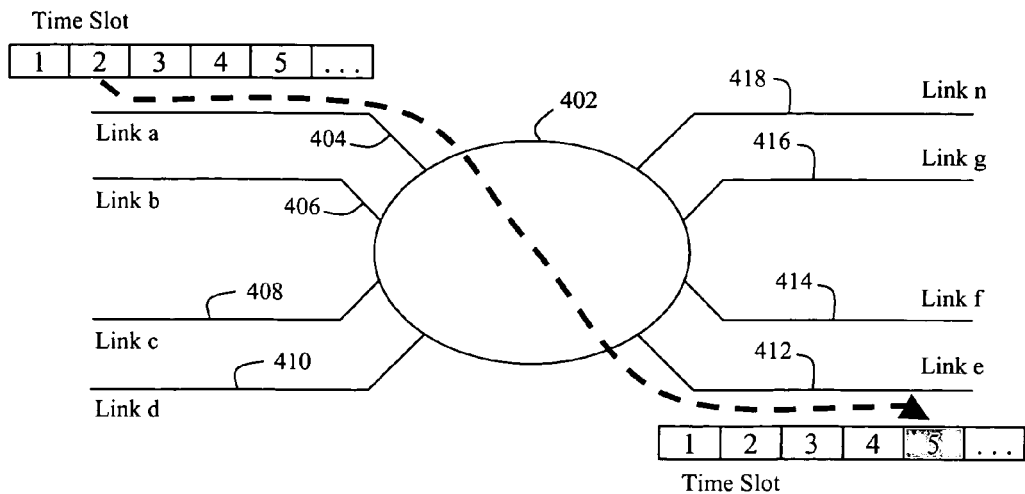
FIG. 8 is a graphic illustration of a network element and a time slot assignment methodology according to a further embodiment of the invention.

Referring to FIG. 8, the node 402 is connected to multiple time slotted links 404, 406, 408, 410, 412, 414, 416 and 418. The time slotted links may be any suitable type of time slotted communication link, such as FLEXRAY links. The node 402 transfers the information, i.e., a payload in a first link resource, e.g., the payload of time slot 2 of link 404, to an assigned link time slot on another link resource, e.g., time slot 6 of link 412. This association between incoming link resources on one link and outgoing link resources on the other link may be statically assigned or dynamically assigned through information contained in the payload, e.g., within a payload header, or may be retained within the network elements. The association may also be assigned by out-of-band signaling (not depicted). If employing dynamic assignment, link resource assignment may be made on an ad hoc basis, namely, each payload receives its own resource assignment. Alternatively, a persistent association may be set up and then torn down after the communication is completed, i.e., the entire message or piece of information is communicated.

Figure 9:
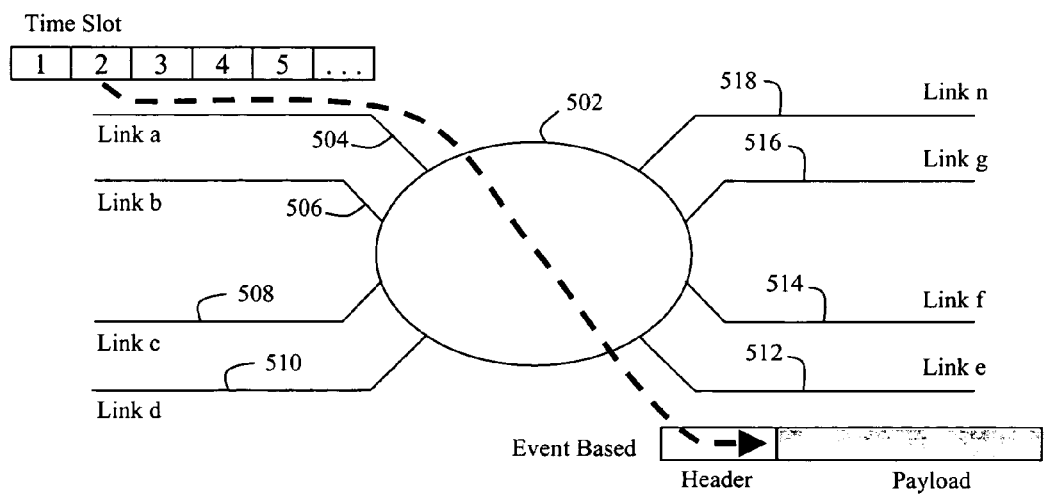
FIG. 9 is a graphic illustration of a network element and a time slot assignment methodology according to a further embodiment of the invention.

Referring to FIG. 9, the node 502 connects multiple time slotted links, e.g., links 504, 506, 508 and 510 to multiple event triggered links, e.g., links 512, 514, 516 and 518. The time slotted links may be any suitable type of time slotted communication link, such as FLEXRAY links, while the event triggered links may be CAN or similar links. The node 502 transfers the information payload, e.g., packet or frame, of a time slot on one link, e.g., the payload of time slot 2 of link 504, to a payload of an event triggered transport frame on another link, e.g., link 512. The time slot information is translated into header information by the node 502 on the event triggered link allowing for delivery of the payload. For example, this information may be normal CAN identification information. It may also be the routing information as defined for the switch fabric to allow further routing of the payload on a network connected to the link 512. While this embodiment shows a time triggered to event triggered arrangement, the reverse is also possible with the event triggered header being translated into an outgoing link and time slot.

Figure 10:
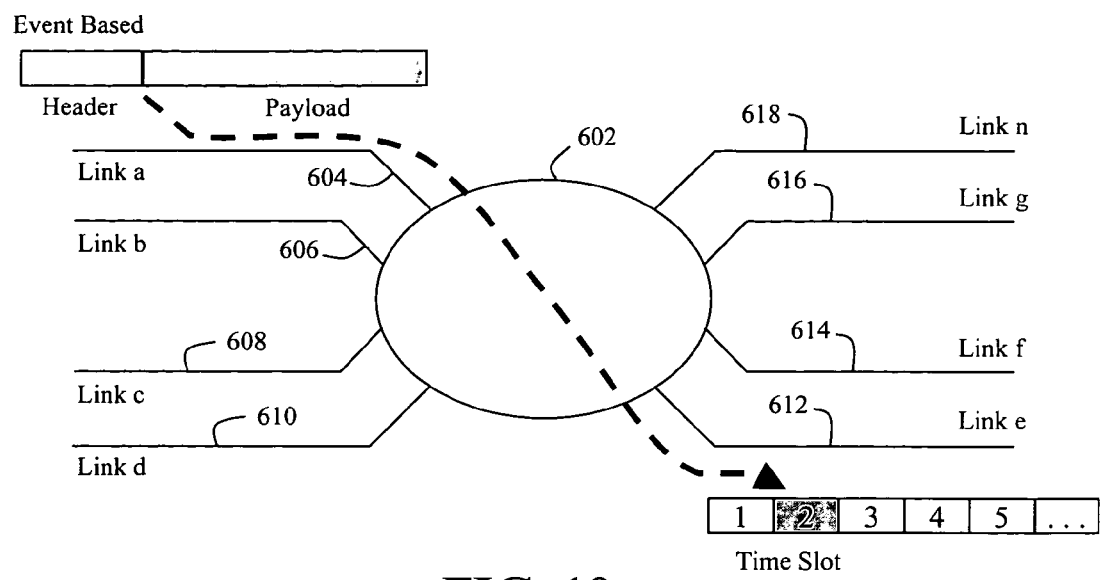
FIG. 10 is a graphic illustration of a network element and a time slot assignment methodology according to a further embodiment of the invention.

For instance, referring to FIG. 10, the node 602 connects multiple event triggered links, e.g., links 604, 606, 608 and 610 to multiple time slotted links, e.g., links 612, 614, 616 and 618. The event triggered links may be any suitable type of event based communication link, such as CAN links, while the time slotted links may be FLEXRAY or similar links. The node 602 transfers the information payload, e.g., packet or frame, of an event triggered transport frame on one link, e.g., link 604, to a payload of a time slot on another link, e.g., the payload of time slot 2 of link 612. The header information is translated into time slot information by the node 602 on the time slotted link allowing for delivery of the payload. For example, this information may be FLEXRAY information. It may also be the routing information as defined for the switch fabric to allow further routing of the payload on a network connected to the link 612.

What has been described is a vehicle network and method for communicating information within a vehicle. The network includes a plurality of network elements joined by communication links. A data frame is provided for communicating information between a first device and a second device attached to the network. A network element in the network is capable of mapping a first resource on an incoming communication link of the network element to a second link resource of an outgoing communication link of the network element. The network element further has ports for receiving the data frame from the first link resource of the incoming communication link and for communicating the data frame to the second link resource of the outgoing communication link. The mapping may be done statically or dynamically such as based on information stored in the network element or based on information stored in the data frame. The above description of the present invention is intended to be exemplary only and is not intended to limit the scope of any patent issuing from this application. The present invention is intended to be limited only by the scope and spirit of the following claims.

What is claimed is:

1. An apparatus comprising:
   an event-based communication link;
   a switch fabric of network elements including a source network element, a destination network element, and a plurality of communication paths between the source network element and the destination network element; and
   wherein the source network element is configured to receive vehicle-device data via the event-based communication link from one or more source vehicle devices and is configured to transmit the vehicle-device data along a selected communication path from the source network element to the destination network element, wherein the selected communication path includes at least one time-slotted communication link and is selected from the plurality of communication paths of the switch fabric of network elements.

2. The apparatus of claim 1, wherein the selected communication path includes at least one intermediate switch-fabric network element that switches a data packet containing the vehicle-device data from a first time slot to a second time slot that is different than the first time slot.

3. The apparatus of claim 2, wherein the destination switch-fabric network element switches the data packet from the second time slot back to the first time slot.

4. The apparatus of claim 1, wherein the selected communication path is generated by the one or more source vehicle devices.

5. The apparatus of claim 4, wherein information specifying the selected communication path is contained within a data packet containing the vehicle-device data.

6. The apparatus of claim 1, wherein the selected communication path is determined by each of the switch-fabric network elements along the selected communication path.

7. The apparatus of claim 6, wherein information specifying a next switch-fabric network element along the selected path is contained within a data packet containing the vehicle-device data.

8. The apparatus of claim 1, wherein the data packet containing the vehicle-device data includes a fixed label that specifies routing information and that remains with the data packet throughout the switch fabric of network elements.

9. The apparatus of claim 8, wherein each of the switch-fabric network elements along the selected communication path includes a table of routing information configured for use in directing the data packet along the selected communication path.

10. An apparatus comprising:
    an event-based communication link;
    a switch fabric of network elements including a source network element, a destination network element, and a plurality of communication paths between the source network element and the destination network element;
    wherein the destination network element is configured to transmit vehicle-device data via the event-based communication link to a destination vehicle device and is configured to receive the vehicle-device data along a selected communication path from the source network element to the destination network element, wherein the selected communication path includes at least one time-slotted communication link and is selected from the plurality of communication paths of the switch fabric of network elements.

11. The apparatus of claim 10, wherein the selected communication path includes at least one intermediate switch-fabric network element that switches a data packet containing the vehicle-device data from a first time slot to a second time slot that is different than the first time slot.

12. The apparatus of claim 11, wherein the destination switch-fabric network element switches the data packet from the second time slot back to the first time slot.

13. The apparatus of claim 10, wherein the selected communication path is generated by the one or more source vehicle devices.

14. The apparatus of claim 13, wherein information specifying the selected communication path is contained within a data packet containing the vehicle-device data.

15. The apparatus of claim 10, wherein the selected communication path is determined by each of the switch-fabric network elements along the selected communication path.

16. The apparatus of claim 15, wherein information specifying a next switch-fabric network element along the selected path is contained within a data packet containing the vehicle-device data.

17. The apparatus of claim 10, wherein the data packet containing the vehicle-device data includes a fixed label that specifies routing information and that remains with the data packet throughout the switch fabric of network elements.

18. The apparatus of claim 17, wherein each of the switch-fabric network elements along the selected communication path includes a table of routing information configured for use in directing the data packet along the selected communication path.

19. An apparatus comprising:
a processor;
a memory having stored therein computer-executable instructions configured to, when executed by the processor, perform operations comprising:
receiving vehicle-device data via an event-based communication link from one or more source vehicle devices, and
transmitting the vehicle-device data along a selected communication path from a source network element of a switch fabric of network elements to a destination network element of the switch fabric of network elements, wherein the selected communication path includes at least one time-slotted communication link and is selected from a plurality of communication paths of the switch fabric of network elements.

20. The apparatus of claim 19, wherein the selected communication path is determined by each of the switch-fabric network elements along the selected communication path.

* * * * *